United States Patent

[11] 3,580,134

| [72] | Inventor | Edwin C. Harrington, Jr. Wilbraham, Mass. |
|---|---|---|
| [21] | Appl. No. | 769,342 |
| [22] | Filed | Oct. 21, 1968 |
| [45] | Patented | May 25, 1971 |
| [73] | Assignee | Monsanto Company St. Louis, Mo. |

[54] MACHINING METHOD
3 Claims, 6 Drawing Figs.

[52] U.S. Cl. .................................................. 90/13C,
90/11C, 235/151.11
[51] Int. Cl. .................................................. B23c 1/16
[50] Field of Search .................................... 90/13.99,
13.9, 11.1; 235/151.11

[56] References Cited
UNITED STATES PATENTS

| 2,961,161 | 11/1960 | Spencer et al. | 90/13.99-X |
| 3,127,506 | 3/1964 | Fayard | 90/13.99 |
| 3,191,111 | 6/1965 | Greene | 235/151.11-X |
| 3,254,203 | 5/1966 | Kviem | 235/151.11 |

*Primary Examiner*—Gil Weidenfeld
*Attorneys*—John W. Klooster, Arthur E. Hoffman and Herbert B. Roberts ABSTRACT: A method for cutting a curved surface on one face of a workpiece so as to produce a longitudinal curverature thereon such that when a specimen in planar sheet form is placed in face-to-face engagement with the resulting curved surface, the strain on the outer surface of such specimen varies linearly with distance along the surface of such specimen.

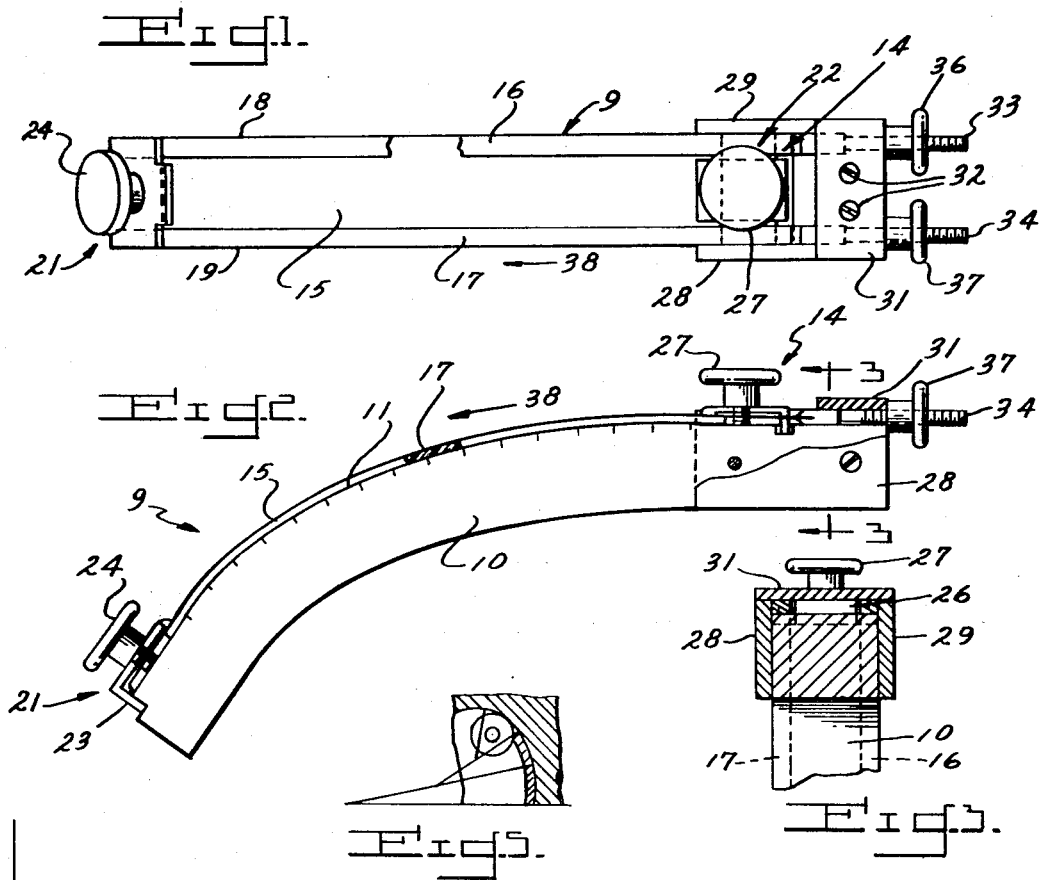
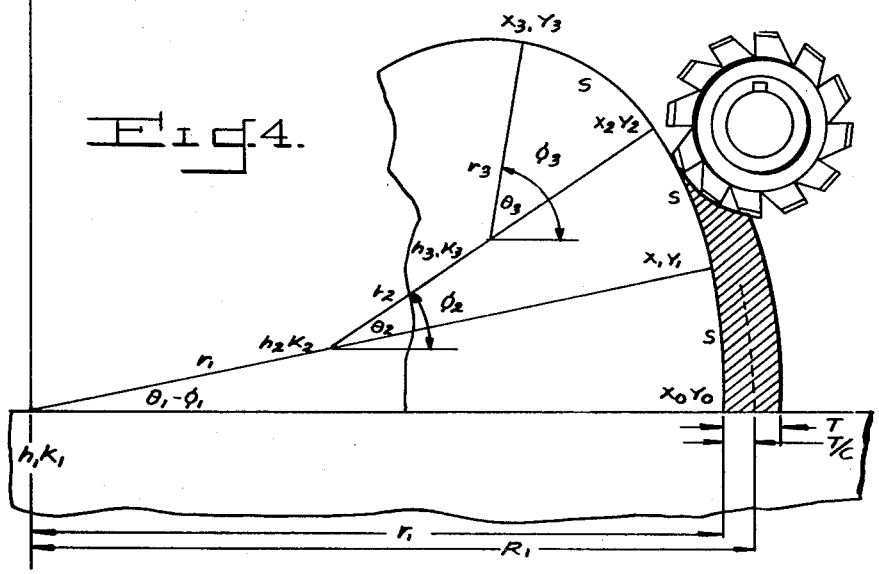

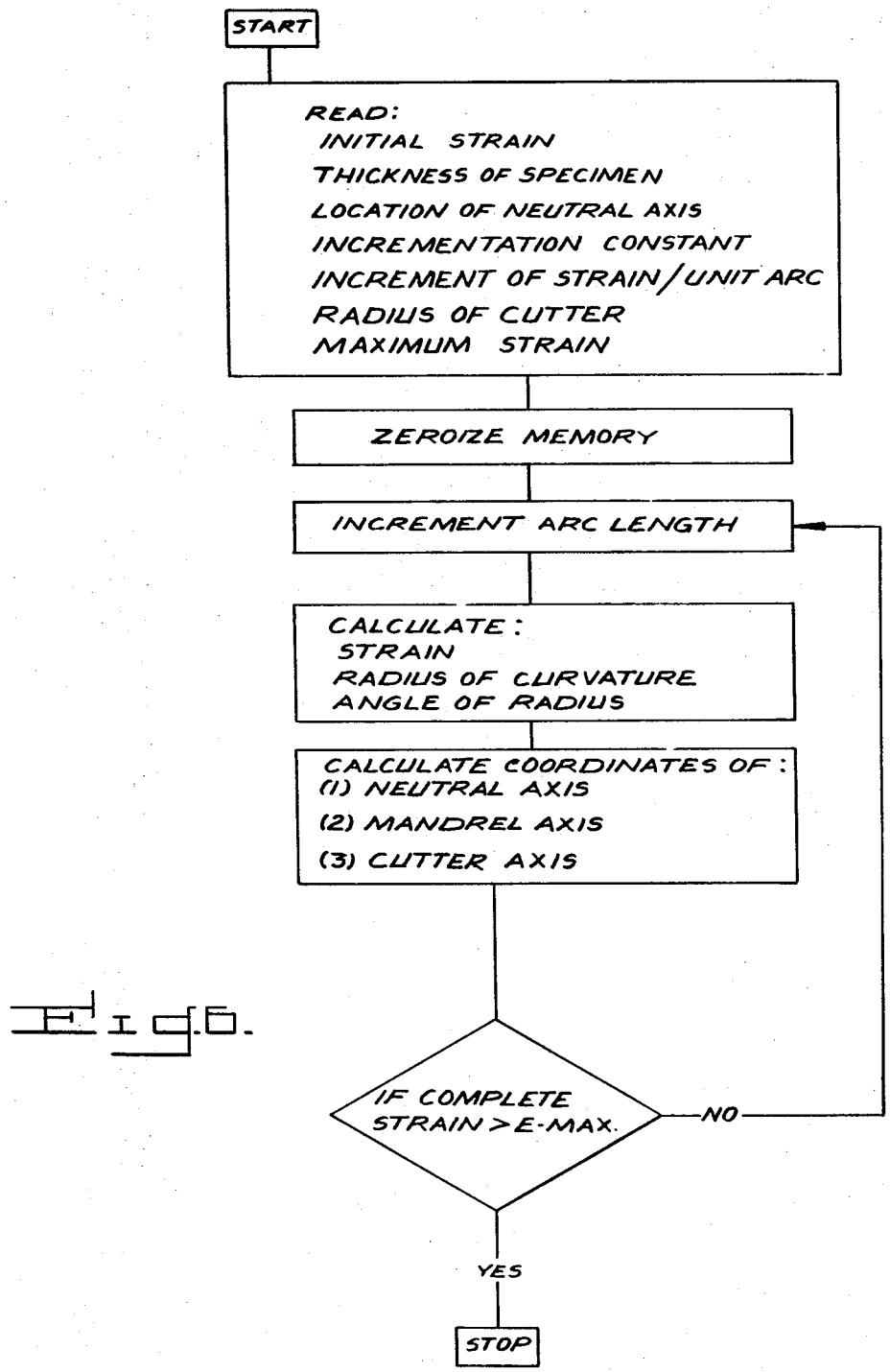

MACHINING METHOD

BACKGROUND

It has been discovered that a useful means for flexing sheet materials so as to rapidly and accurately measure critical strain in the flexural mode involves the use of a device having a mandrel, one surface of which is transversely flat but longitudinally curved convexly. This curvature is such that strain on the outer surface of a sheet specimen held against such sheet surface linearly increases with longitudinal distance along such surface in one direction.

The production of a mandrel having such a curved surface is a very difficult business to accomplish because of variables which must be taken into account in producing such surface by any known means.

There has now been discovered a method by which one can produce, using a revolvable cutting head and a workpiece in which the curved surface is to be produced, a curved surface of the type desired in a simple and very efficient manner. The essence of the method lies in the discovery of not only a mathematical relationship which describes in symbolic terms this desired curved surface, but also a practical means for using this mathematical relationship to produce the desired curved surface.

DRAWINGS

For a better understanding of the invention, reference is made to the following description taken in conjunction with the accompanying drawings in which:

FIG. 1 is a top plan view of one embodiment of a testing device of this invention;

FIG. 2 is a side elevational view of the device shown in FIG. 1;

FIG. 3 is a vertical sectional view taken along the line 3—3 of FIG. 2;

FIG. 4 is a diagrammatic representation showing geometrical considerations of a milling machine operation in which the convexly curved surface of the mandrel employed in the device of FIGS. 1, 2 and 3 is being made;

FIG. 5 is a simplified representation similar to FIG. 4 but showing production of a concavely curved surface which is the inverse of that shown in FIG. 4 but which is useful as a mold element in forming the device of FIGS. 1, 2, and 3, and FIG. 6 illustrates a computer program suitable for use in generating the surface illustrated in FIGS. 4 and/or 5.

SUMMARY

The present invention, as indicated above, relates to a method for cutting a curved surface on one face of a workpiece. This curved surface is transversely flat but longitudinally curved. This longitudinal curvature is such that, when a specimen in planar sheet form of material having generally uniform composition and thickness characteristics is placed in face-to-face engagement with said curved surface, the strain on the outer surface of such specimen varies linearly with distance along the surface of the specimen, this method comprises the steps of:

A. establishing X and Y rectangular coordinates within a said workpiece, and establishing X and Y rectangular coordinates for the axis of a revolvably operating cutting means adapted to cut said workpiece whereby the relative spatial relationships between said workpiece and said cutting means are established, B. continuously varying the X and Y rectangular coordinates for said cutting means according to the relationship:

(3) $XM_{n+1} = X_{n+1} - \text{COS}(\Phi_{n+1})TN$ (4) $YM_{n+1} = Y_{n+1} - \text{SIN}(\Phi_{n+1})TN$ wherein $XM$ and $YM$ are the rectangular coordinates for the mandrel, $X_{n+1}$ is $X_n + R_{n+1}(\text{COS}\Phi_{n+1}\text{COS}\Phi_n)$, $Y_{n+1}$ is $Y_n + R_{n+1}(\text{SIN}\Phi_{n+1}\text{SIN}\Phi_n)$, $R_{n+1}$ is $\dfrac{T(1-N)}{C(S+\Delta S)+E_0}$ $\theta_{n+1}$ is $\theta_n - \dfrac{\Delta S}{R}$ $T$ is thickness of test specimen, $N$ is distance from inner surface of test specimen to neutral axis divided by thickness, $E_o$ is initial strain, $S$ is length of arc, $C$ is increment of strain per unit length of arc, $n$ is an integer, and simultaneously continuously varying the X and Y rectangular coordinates for said work piece according to the relationship:

(5) $XC_{n+1} = XM_{n+1} \pm \text{COS } \Phi_{n+1}(\text{Radius of cutter}) \pm \text{Radius of cutter-TN}$ (6) $YC_{n+1} = YM_{n+1} \pm \text{SIN } \Phi_{n+1}(\text{Radius of cutter})$ wherein $XC$ and $YC$ are the rectangular coordinates for the cutter and the other terms are as defined above provided that a convenient starting value for $S$ in any given instance is 0.0 and a convenient starting value for $\Phi$ is 3.14159, whereby said cutting means continuously removes material from said workpiece thereby to define the desired curved surface on said workpiece.

Those of ordinary skill in the art will be aided in appreciating the significance of equations 3, 4, 5, and 6 from a consideration of the following equations:

(1) $X_{n+1} = X_n + R_{n+1}(\text{COS } \Phi_{n+1} - \text{COS } \Phi_n)$ (2) $Y_{n+1} = Y_n + R_{n+1}(\text{SIN } \Phi_{n+1} - \text{SIN } \Phi_n)$ wherein each of the terms is as defined above except that $X$ and $Y$ represent rectangular $X$ and $Y$ coordinates for the longitudinally curved surface desired as described above and herein below. The parametric equations 1 and 2, in fact, can be represented as defining the neutral axis of a specimen held in face-to-face engagement with the longitudinally curved surface desired.

It will be appreciated that any conventional milling machine means can be adapted for use in practicing the method of the present invention since such machines customarily have the rapidity to define a pair of X and Y rectangular coordinates and in addition having means for holding a workpiece to be machined and having cutting means revolvably operating on a predetermined axis.

SUMMARY

Turning to the drawings, there is seen in FIGS. 1—3 one embodiment of a strain testing device of this invention, herein designated in its entirety by the numeral 9. The device 9 includes an elongated mandrel 10 which has a curved surface 11. Curved surface 11 is transversely flat but convexly curves in a longitudinally extending direction with respect to the mandrel 10. The mandrel 10 can be formed of any convenient material such as metal, plastic, or the like. The particular material used to make a given mandrel 10 depends upon the particular type of use to which the device 9 is to be employed. Obviously, one chooses a material for constructing mandrel 10 which will be relatively inert under the particular environmental test conditions to be employed when using the strain testing device 9.

The device 9 is equipped with clamping means, herein designated in its entirety by the numeral 14, which functionally is associated with the mandrel 10 and is adapted to hold a specimen 15 uniformly in face-to-face engagement with surface 11 of mandrel 10. Specimen 15 is in sheet form and is composed of a material having generally uniform composition and thickness characteristics. Typically and preferably, the material of the specimen 15 is a polymer such as a homopolymer, copolymer, graft copolymer, homogeneous mixture of different polymers or the like.

which is transversely flat but which is convexly curved in a longitudinally extending direction. Because of the configuration of the curve, strain on the outer surface of the specimen 15 linearly increases with longitudinal distance along the sur- oriented relative to surface 11 as to extend longitudinally thereover in the region of a different respective side edge 18 and 19 thereof.

To hold opposite end regions of each band 16 and 17 in face-to-face engagement with surface 11 of mandrel 10, a securing means is provided. Thus, two end clamps 21 and 22, respectively, are provided. End clamp 21 comprises a shoe 23 and a knurled thumb screw 24, the shank of which (not shown) extends freely through shoe 23 and threadably engages a mating socket (not shown) in mandrel 10. Observe that shoe 23 is formed so as to exert a clamping action upon the trailing end of the sample specimen 15.

End clamp 22 comprises a shoe 26 and a knurled thumb screw 27, the shank of which (not shown) extends freely through shoe 26 and threadably engages a mating socket (not shown) in mandrel 10. Although the respective bands 16 and 17 are rigidly fixed to shoe 23, these bands do not engage shoe 26 but the respective opposite side edges of shoe 26 cooperate with a pair of flanges 28 and 29 fastened to mandrel 10 in the region of shoe 26. Thus, the bands 16 and 17 ride in channels defined by the flanged edges 28 and 29 and by shoe 26.

A top plate 31 extends transversely across the end of mandrel 10 and is rigidly secured thereto by a pair of screws 32 which extend through top plate 31 and engage mating socket (not shown). Conveniently, top plate 31 butts into flanged edges 28 and 29 for rigidity.

A pair of screws 33 and 34 are provided. The forward end of each screw 32 and 33 is rigidly associated with a different band 16 and 17, respectively, as by welding, gluing (as with epoxy adhesive) or the like. Each screw 33 and 34 slides freely in a longitudinally extending channel. A knurled nut 36 and 37 threadably engages each respective screw 33 and 34 as the respective knurled nuts are tightened against the rigid combination of top plate 31 and mandrel 10 and respective bands 16 and 17 (depending upon which knurled nut 36 or 37 is turned) are stretched and tightened or loosened as respects face-to-face engagement of the bands 16 and 17 with the surface 11 of mandrel 10.

A procedure for mounting a specimen 15 in device 9 is as follows:

Knurled thumb screw 24 is turned so as to remove the end clamp 21 from the surface 11 or mandrel 10. At this point, a specimen 15 is inserted between the raised bands 16 and 17 and the surface 11 of mandrel 10. Usually and preferably, the edge of specimen 15 is indexed in relation to the shoe 26 so as to precisely align the specimen 15 on the surface 11. Thus, conveniently, one may desire to align the specimen 15 with ruled marks on the surface 11 (not shown) which serve to permit direct reading of the device 9, as those skilled in the art will appreciate. Next, the end clamp 22 is tightened by means of the thumb screw 27. Thereafter, the bands 16 and 17 are moved towards the surface 11 of mandrel 10 until the end clamp 21 can be secured to mandrel 10 by means of the knurled thumb screw 24. Knurled thumb screw 24 is tightened until the clamp is rigidly secured to mandrel 10. Now, knurled thumb screw 27 is loosened and at this point the knurled nuts 36 and 37 are tightened against the adjoining adjacent surfaces of top plate 31 and mandrel 10 so as to bring the surface of specimen 15 which is adjacent surface 11 into face-to-face engagement with one another. Finally, the knurled thumb screw 27 is retightened. Observe that for diagrammatic descriptive purposes, band 16 is broken away to demonstrate that the specimen 15 is there beneath. After specimen 15 is so mounted into the device 9, the entire assembly can be subjected to a controlled environment or alternatively direct reading of any cracks formed in the surface of specimen 15 can be read.

When a specimen 15 is so mounted in the device 9, the specimen 15 has been formed into a curved configuration In the device 9, the clamping means 14 includes a pair of flexible bands 16 and 17, respectively. These bands are preferably composed of a flexible but relatively inelastic material such as steel, or the like. Each band 16 or 17 is so face 11 of specimen 15 in the direction indicated by the arrow 38.

It will be appreciated from the foregoing that the curvature associated with a surface 11 is dependent upon the thickness of a specimen that one desires to test. Assuming for purposes of illustration that one desires to have a linearly increasing strain with sample length and that the sample has a thickness of one-tenth inch, the nature of the curvature associated with surface 11 becomes fixed when one desires to practice the present invention. The curvature associated with a given surface 11 can be made by any convenient means as those skilled in the art will readily appreciate. For example, one procedure is to mount a workpiece in a milling machine and to carefully mill away portions of the workpiece on an incremental basis until the desired curved surface 11 is produced. To accurately obtain a desired strain gradient along such a surface being such generated, one may employ a strain gauge to periodically measure the curvature at a given locus and thereby verify that the desired linearity relationship is being achieved. Of course, it is desirable and preferred when employing this procedure to cut away gradually since it is easier to cut away material than it is to restore a surface once the cut has been made to a greater depth than desired for purposes of obtaining the desired curvature.

It is easier, however, to establish in more precise terms a relationship between a workpiece and a cutting edge prior to generating a surface 11; thus, FIG. 4 illustrates one procedure for calculating the coordinates of a spiral arc in a surface 11 such that a specimen 15, when bent to such arc, experiences a uniformly increasing strain on its (the specimen) outer surface. Such a surface 11, when made, provides a linearly increasing strain over the entire length of a specimen 15. In FIG. 4:

$r_i$ designates radius of curvature.

$h_i$, $k_i$ designates coordinates of $r_i$ (center curvature).

$\Theta$, $\Phi$ designates angle subtended by $r_i$ from previous $r_i$ and with initial X axis respectively.

S designates increment of arc.

$X_i$, $Y_i$ designates coordinates on surface of bending form curve.

T designates thickness of sample.

$R_1$ designates radius of neutral axis.

$CX_i$, $CY_i$ designates coordinates of cutting tool center axis.

This geometry enables one to locate the coordinates of a center of a profile cutter, as in a milling machine, when such cutter is used to machine a surface 11 of a mandrel 10. This geometry shown in FIG. 4 is necessary since the cutter axis has X, Y coordinates which differ from the X, Y coordinates of the workpiece being machined since the coordinates of the radius of curvature for the profile cutter are changing continuously to provide linearity of strain with respect to sample length. The general relationship between a workpiece and a cutter is given by the following parimetric equations, which are the parimetric equations of the neutral axis, the neutral axis being the midpoint of a specimen 15:

(1) $X_{n+1} = X_n + R_{n+1}(\cos \Phi_{n+1} - \cos \Phi_n)$
(2) $Y_{n+1} = Y_n + R_n (\sin \Phi_{n+1} - \sin \Phi_n)$ where, $$R_{n+1} = \frac{T(1-N)}{C(S+\Delta S) + E_0}$$

$$\theta_{n+1} = \theta_n - \frac{\Delta S}{R}$$

And
$S_o = 0.0$
$\Phi_o = 3.14159$
T is thickness of test specimen.
N is distance from inner surface of test specimen to neutral axis divided by thickness.

$E_o$ is initial strain.

S is length of arc.

C is increment of strain per unit length of arc.

$n$ is an integer which designates an increment in effect along a surface 11.

When equations 1 and 2 are reduced to the coordinates of the workpiece which is to become a mandrel 10, the following equations are developed:

(3) $XM_{n+1}=X_{n+1}-\COS(\Phi_{n+1})TN$ (4) $YM_{n+1}=Y_{n+1}-\SIN(\Phi_{n+1})TN$ wherein the terms are each as above-defined except for XM and YM which are used to define the coordinates of the mandrel.

When equations 1 and 2 are reduced to the coordinates of the axis of the cutter, the following equations are developed.

(5) $XC_{n+1}=XM_{n+1}\pm\COS \Phi_{n+1}$ (Radius of cutter)+Radius of cutter−TN (6) $YC_{n+1}=YM_{n+1}\pm\SIN \Phi_{n+1}$ (Radius of cutter)

wherein the terms are each as above defined except for XC and YC which are used to define the coordinates of the cutter.

A computer program based upon the above equations can be used to provide calculations for the coordinates of each a workpiece and a cutter for any given:

A. increment of outer fiber strain per increment of arc (strain gradient).

B. specimen thickness.

C. neutral axis multiplier (normally 0.5). Laminates or composite structures may differ.

D. radius of profile cutter.

E. initial strain.

The outer strain on the exposed surface of specimen 15 bent over convex surface 11 may be defined as the thickness of the test specimen divided by two times the radius of curvature of the specimen neutral axis. For example, the radius of the surface 11 in the device 9 can be considered to be such that a 0.100 inch thick specimen bent over the form experiences a linearly increasing strain of 0.1 percent per inch of specimen length. The outer (fiber) strain on the specimen 15 can then be considered to range from 0.2 percent at the origin to 1.0 percent over a specimen length of 8 inches. A correction curve for the actual strain on the outer fiber of surface 11 in a device 9 should be determined due to small errors in manufacture. For example, if mandrel 10 is a metal, (such as aluminum) produced by machining, errors in alignment, errors in master, vibration errors, and the like can result. These errors are in part due to cost-time considerations in cutting of a surface 11. A correction curve can be conveniently developed by bonding a strain gauge such as a Baldwin SR-4-FAP-25-12 on a 10-mil steel feeler gauge with Eastman 910 adhesive and checking the strain along the bending form every 0.2 inches with the strain gauge indicator bridge. The gauge is calibrated on cylindrical shapes of known diameter. The outer fiber strain may be obtained from the relationship given previously except that the specimen thickness is replaced by the strain gauge-feeler gauge-adhesive composite thickness.

EMBODIMENTS

The following examples are set forth to illustrate more clearly the principles and practice of this invention to one skilled in the art and they are not intended to be restrictive but merely to be illustrative of the invention herein contained.

To practice the method of the present invention, it is desirable to employ a computer program.

THE FOLLOWING COMPRISES A COMPUTER PROGRAM IN FORTRAN 4 FOR CALCULATING THE COORDINATES OF A HYPERBOLIC SPIRAL BY NUMERICAL INTEGRATION OF THE PARAMETRIC EQUATIONS. SUBSEQUENTLY, THIS PROGRAM CALCULATES THE COORDINATES OF A MANDREL, AND OF A CUTTER TO PRODUCE THAT MANDREL, SUCH THAT THE NEUTRAL AXIS OF A TEST SPECIMEN OF THICKNESS, T, WILL CONFORM TO THAT SPIRAL.

```
        Read (2, 1) E,T,Q,DS,C,RAD
 1      Format (6F10.0)
        C  E=Initial strain
        C  T=Thickness of specimen
        C  Q=Location of neutral axis, decimal fraction from inner
              surface
        C  DS=Increment on arc for numerical integration
        C  C=Increment of strain per unit length of arc.
              =(Emax−E)/Total length
        C  RAD=Radius of cutter
        Write (3,3)
 3      Format (1H1, 'Arc Length Strain Radius Angle XNeut
        YNeut XMandrel YMandrel XCutter YCutter ',/)
        S    =0.0
        X    =0.0
        Y    =0.0
        PHI  =3.14159
        F    =−1.0
        G    =0.0
100     S    =S+DS
        ST   =C*S+E
        R    =T*(1.0−Q)/ST
        PHI  =PHI−DS/R
        A    =COS(Phi)
        B    =SIN(Phi)
        X    =X+R*(A−F)
        Y    =Y+R*(B−G)
        XM   =X−T*Q*A
        XC   =XM+A*RAD+RAD−T*Q
        YM   =Y−T*Q*B
        YC   =YM+B*RAD
        F    =A
        G    =B
        Write (3,2) S,ST,R,PHI,X,Y,XM,YM,XC,YC
 2      Format (1H, 10F10.5)
        If (Phi+3.14159) 110,110,100
110     Call exit
        End
```

Using the foregoing program and, using, for example, an IBM Type 1130 Computer, the following typical output is generated as set forth in Table 1 below. It will be appreciated that the values in Table 1 can either be regarded as being in the metric system or in the English system as long as one is consistent. By using the data in Table 1, a curved surface is generated on a mandrel 10 from a workpiece so as to provide a mandrel element for a device substantially as described herein above.

TABLE I

Increment of arc per increment of strain=.100000
Increment of strain=.000100
Thickness of test piece=.100000
Neutral axis multiplier=.500000
Radius of profile cutter=1.000000

[0.100 Gauge]

| N | Strain to here | Mandrel arc length | Cumulative angle, radians | Mandrel X | Mandrel Y | Cutter center X+50 | Cutter center Y |
|---|---|---|---|---|---|---|---|
| 0 | 0.0000 | 0.0000 | 0.0000 | −.0500 | 0.0000 | 50.9500 | 0.0000 |
| 1 | .0021 | .1000 | .0042 | −.0502 | .0999 | 50.9497 | .1042 |
| 2 | .0022 | .2000 | .0086 | −.0508 | .2047 | 50.9490 | .2133 |
| 3 | .0023 | .3000 | .0132 | −.0520 | .3093 | 50.9478 | .3225 |
| 4 | .0024 | .4000 | .0180 | −.0536 | .4136 | 50.9461 | .4317 |
| 5 | .0025 | .5000 | .0230 | −.0558 | .5178 | 50.9439 | .5408 |
| 6 | .0026 | .6000 | .0282 | −.0584 | .6217 | 50.9411 | .6500 |
| 7 | .0027 | .7000 | .0336 | −.0616 | .7256 | 50.9377 | .7592 |
| 8 | .0028 | .8000 | .0392 | −.0654 | .8292 | 50.9337 | .8585 |
| 9 | .0029 | .9000 | .0451 | −.0698 | .9327 | 50.9291 | .9775 |
| 10 | .0030 | 1.0000 | .0511 | −.0748 | 1.0360 | 50.9238 | 1.0871 |
| 11 | .0031 | 1.1000 | .0573 | −.0804 | 1.1392 | 50.9179 | 1.1965 |
| 12 | .0032 | 1.2000 | .0637 | −.0866 | 1.2433 | 50.9112 | 1.3060 |
| 13 | .0033 | 1.3000 | .0703 | −.0935 | 1.3452 | 50.9039 | 1.4155 |
| 14 | .0034 | 1.4000 | .0772 | −.1011 | 1.4479 | 50.8958 | 1.5251 |
| 15 | .0035 | 1.5000 | .0842 | −.1094 | 1.5505 | 50.8869 | 1.6347 |
| 16 | .0036 | 1.6000 | .0914 | −.1185 | 1.6530 | 50.8773 | 1.7444 |
| 17 | .0037 | 1.7000 | .0988 | −.1282 | 1.7553 | 50.8668 | 1.8541 |
| 18 | .0038 | 1.8000 | .1065 | −.1388 | 1.8575 | 50.8555 | 1.9638 |
| 19 | .0039 | 1.9000 | .1143 | −.1501 | 1.9595 | 50.8433 | 2.0736 |
| 20 | .0040 | 2.0000 | .1223 | −.1622 | 2.0614 | 50.8302 | 2.1835 |
| 21 | .0041 | 2.1000 | .1306 | −.1751 | 2.1631 | 50.8163 | 2.2933 |
| 22 | .0042 | 2.2000 | .1390 | −.1889 | 2.2646 | 50.8014 | 2.4032 |
| 23 | .0043 | 2.3000 | .1476 | −.2035 | 2.3659 | 50.7855 | 2.5131 |
| 24 | .0044 | 2.4000 | .1565 | −.2190 | 2.4671 | 50.7686 | 2.6230 |

It will be appreciated that the method of this invention can be used to produce either a convex or a concave surface. While the foregoing description and embodiment have been primarily directed to producing a convex surface, a concave surface alternatively can be produced if desired. When a convex surface is to be produced, all terms in equations 5 and 6 are positive except for the value TN in equation 5. On the other hand, when it is desired to produce a concave surface, the values for the terms involving the cosine of $\Phi$ (equation 5) and the sine of $\Phi$ (equation 6) as well as the sign of the radius of cutter (equation 5) are negative.

I claim:

1. A method for cutting a curved surface on one face of a workpiece, said curved surface being transversely flat but longitudinally curved, the longitudinal curvature being such that, when a specimen in planar sheet form of material having generally uniform composition and thickness characteristics is placed in face-to-face engagement with said curved surface, the strain on the outer surface of such specimen varies linearly with distance along the surface of the specimen, said method comprising the steps of:

A. establishing X and Y rectangular coordinates within said workpiece, and establishing X and Y rectangular coordinates for the axis of a revolvably operating cutting means adapted to cut said workpiece whereby the relative spatial relationships between said workpiece and said cutting means are established; and B. continuously varying the X and Y rectangular coordinates for said cutting means according to the relationship:

$XM_{n+1} = X_{n+1} - COS(\Phi_{n+1})TN$
$YM_{n+1} = Y_{n+1} - SIN(\Phi_{n+1})TN$ wherein XM and YM are the rectangular coordinates for the mandrel, $X_{n+1}$ is $X_n + R_{n+1}(COS\ \Phi_{n+1} - COS\ \Phi_n)$,
$Y_{n+1}$ is $Y_n + R_{n+1}(SIN\ \Phi_{n+1} - SIN\ \Phi_n)$, $$R_{n+1} \text{ is } \frac{T(1-N)}{C(S+\Delta S)+E_0}$$

$$\theta_{n+1} \text{ is } \theta_n - \frac{\Delta S}{R}$$

T is thickness of test specimen,
N is distance from inner surface of test specimen to neutral axis divided by thickness,
$E_o$ is initial strain,
S is length of arc,
C is increment of strain per unit length of arc,
$n$ is an integer, and simultaneously continuously varying the X and Y rectangular coordinates for said workpiece according to the relationship:

$XC_{n+1} = XM_{n+1} \pm COS\ \Phi_{n+1}$(Radius of cutter) $\pm$ Radius of cutter $-$ TN
$YC_{n+1} = YM_{n+1} \pm SIN\ \Phi_{n+1}$ (Radius of cutter)

XC and YC are the rectangular coordinates for the cutter and the other terms are as defined above provided that a convenient starting value for S in any given instance is 0.0 and a convenient starting value for $\Phi$ is 3.14159.

whereby said cutting means continuously removes material from said workpiece thereby to define the desired curved surface on said workpiece.

2. The method of claim 1 wherein the curved surface is convex.

3. The method of claim 1 wherein the curved surface is concave.

UNITED STATES PATENT OFFICE
CERTIFICATE OF CORRECTION

Patent No. 3,580,134                           Dated May 25, 1971

Inventor(s)   Edwin C. Harrington, Jr.

It is certified that error appears in the above-identified patent and that said Letters Patent are hereby corrected as shown below:

Column 3, lines 1 to 4 should be deleted and the following inserted -- In the device 9, the clamping means 14 includes a pair of flexible bands 16 and 17, respectively. These bands are preferably composed of a flexible but relatively inelastic material such as steel, or the like. Each band 16 or 17 is so- --. Column 4, lines 1 to 4 should be deleted and the following inserted -- which is transversely flat but which is convexly curved in a longitudinally extending direction. Because of the configuration of the curve, strain on the outer surface of the specimen 15 linearly increases with longitudinal distance along the sur- --. Column 6, line 62, "8285" should read -- 8685 --; line 65, "1.2433" should read -- 1.2423 --.

Signed and sealed this 18th day of January 1972.

(SEAL)
Attest:

EDWARD M. FLETCHER, JR.                ROBERT GOTTSCHALK
Attesting Officer                      Acting Commissioner of Patents